US010928822B2

(12) United States Patent
Afzal et al.

(10) Patent No.: US 10,928,822 B2
(45) Date of Patent: Feb. 23, 2021

(54) MOBILE ROBOT, METHOD OF NAVIGATING THE SAME, AND STORAGE MEDIUM

(71) Applicant: King Fahd University of Petroleum and Minerals, Dhahran (SA)

(72) Inventors: Waqas Afzal, Dhahran (SA); Ahmad A. Masoud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/044,580

(22) Filed: Jul. 25, 2018

(65) Prior Publication Data

US 2020/0033862 A1    Jan. 30, 2020

(51) Int. Cl.
  *G05D 1/00* (2006.01)
  *G05D 1/02* (2020.01)
  *G01C 21/34* (2006.01)

(52) U.S. Cl.
  CPC ....... *G05D 1/0214* (2013.01); *G01C 21/3453* (2013.01); *G05D 1/0088* (2013.01); *G05D 1/0223* (2013.01); *G05D 1/0238* (2013.01); *G05D 1/0285* (2013.01); *G05D 2201/0207* (2013.01)

(58) Field of Classification Search
  CPC .. G05D 1/0214; G05D 1/0285; G05D 1/0238; G05D 1/0223; G05D 1/0088; G05D 2201/0207; G01C 21/3453; G01C 21/3461; G01C 21/005; G01C 21/20
  USPC .... 701/22, 23, 122, 202, 209, 210; 700/245, 700/258; 340/540, 425.5, 600; 348/148
  See application file for complete search history.

(56) References Cited

U.S. PATENT DOCUMENTS

| | | | | |
|---|---|---|---|---|
| 6,151,539 A | * | 11/2000 | Bergholz | G01S 17/89 |
| | | | | 701/25 |
| 6,182,007 B1 | * | 1/2001 | Szczerba | G01C 21/20 |
| | | | | 701/122 |

(Continued)

OTHER PUBLICATIONS

Afzal, et al. ; Harmonic Potential-Based Communication-Aware Navigation of Mobile Agents in Cluttered Spaces ; 2016 IEEE 55th Conference on Decision and Control (CDC) ; Dec. 12-14, 2016 ; 6 Pages.

(Continued)

*Primary Examiner* — Shardul D Patel
(74) *Attorney, Agent, or Firm* — Oblon, McClelland, Maier & Neustadt, L.L.P.

(57) ABSTRACT

A mobile robot including a motion actuator; at least one detection sensor configured to detect field information in a movement field of the mobile robot; a guidance generation unit configured to generate a motion guidance policy to a target position from a current position, the motion guidance policy being updated by the guidance generation unit when the field information has been received from the at least one detection sensor; a safety sensitization unit configured to generate a safety sensitized policy which is the motion guidance policy with a reduced velocity magnitude relative to an angle between the motion guidance policy and the current motion of the mobile robot; and a motion actuation unit configured to determine an actuation signal for instructing the motion actuator to project the current motion of the mobile robot in conformity with the safety sensitized policy provided by the safety sensitization unit.

20 Claims, 27 Drawing Sheets

(56) References Cited

U.S. PATENT DOCUMENTS

| | | | | |
|---|---|---|---|---|
| 7,089,084 | B2* | 8/2006 | Ohta | B64C 33/00 |
| | | | | 700/245 |
| 9,623,564 | B2* | 4/2017 | Al-Shaikhi | B25J 9/1694 |
| 2008/0136626 | A1* | 6/2008 | Hudson | G01S 17/86 |
| | | | | 340/540 |
| 2009/0143931 | A1* | 6/2009 | Sekiya | G05D 1/0246 |
| | | | | 701/23 |
| 2011/0054689 | A1* | 3/2011 | Nielsen | G05D 1/0088 |
| | | | | 700/258 |
| 2015/0158178 | A1* | 6/2015 | Burmeister | B25J 9/1676 |
| | | | | 382/203 |
| 2017/0168480 | A1* | 6/2017 | Wanstedt | G01C 21/3461 |
| 2018/0035606 | A1* | 2/2018 | Burdoucci | A01D 34/008 |
| 2019/0105779 | A1* | 4/2019 | Einav | B25J 9/1676 |

OTHER PUBLICATIONS

Ghaffarkhah, et al. ; Communication-Aware Navigation Functions for Cooperative Target Tracking ; 2009 American Control Conference ; Jun. 10-12, 2009 ; 7 Pages.

Mostofi, Yasamin ; Decentralized Communication-Aware Motion Planning in Mobile Networks: An Information-Gain Approach ; J Intell Robot System ; May 23, 2009 ; 24 Pages.

Minguez, et al. ; Sensor-basedrobot motion generation in unknown, dynamic and troublesome scenarios ; Robotics and Autonomous Systems 52 (2005) 290-311 ; Jul. 28, 2005 ; 22 Pages.

Lindhe, et al. ; Using Robot Mobility to Exploit Multipath Fading ; Wireless Communications in Networked Robotics ; IEEE Wireless Communications ; Feb. 2009 ; 8 pages.

Ghaffarkhah, et al. ; Communication-Aware Motion Planning in Mobile Networks ; IEEE Transactions on Automatic Control, vol. 56, No. 10, Oct. 2011 ; 8 pages.

Yan, et al. ; To Go or Not to Go: On Energy-Aware and Communication-Aware Robotic Operation ; IEE Transactions on Control of Network Systems, vol. 1, No. 3, Sep. 2014 ; 14 pages.

Gil, et al. ; Adaptive Communication in Multi-Robot Systems Using Directionality of Signal Strength ; 18 Pages.

Ali, et al. ; Motion and Communication Co-optimization with Path Planning and Online Channel Prediction† ; 2016 American Control Conference, Jul. 6-8 ; 6 Pages.

Muralidharan, et al. ; Path Planning for a Connectivity Seeking Robot ; 6 pages ; 2017.

* cited by examiner

MOBILE ROBOT, METHOD OF NAVIGATING THE SAME, AND STORAGE MEDIUM

BACKGROUND

Field of Disclosure

The present disclosure relates generally to a mobile robotics platform for navigating a known or unknown topography in an obstacle-avoiding and/or communication-aware manner, a method of navigation for a mobile robotics platform, and a non-transitory computer-readable storage medium storing instructions for causing a computer to navigate a robotics platform.

Description of the Related Art

Recently, there has been a growing demand for the development of robotics aids, for example, to help first responders in firsthand evaluation of emergency-related incidents. The information obtained by such systems is critical and serves as the primary link in a chain of information exchange that leads to making important decisions. To be useful, it is necessary that such aids provide a human operator with situational awareness in a timely and constrained manner.

In addition, there are other strict and challenging properties these types of robots should have. In a first responder situation, for example, a mobile robot should be able to move to a designated area in an unstructured and unknown environment. Robot deployment cannot always rely on accurate maps since they are often not available. The robot should be able to function under zero a priori knowledge without engaging in time-consuming activities reserved for exploration and mapping only. The entire robot's effort should be dedicated to reaching the target zone of interest using the necessary and sufficient information its sensors pick-up en route to the target.

The robot should also be able to accommodate any available a priori information in its database. This information is used to accelerate convergence and enhance performance. What makes the problem excessively difficult in a first responder situation is the requirement that the robot maintains a good wireless communication link with a base station, preferably all of the time. Accommodating hard spatial components (e.g. obstacles) of the environment in an autonomous navigation process may be reasonably understood in terms of spatial geometry and topology. However, accommodating signal strength (the soft component of the environment) is still a major challenge. This is due to the fact that the spatial distribution of signal strength (FIG. 1) in a cluttered environment cannot be described using geometry or topology. The complexity of the situation rapidly increases when soft and hard context are jointly factored into the projection of a first responder-grade motion for the robot.

U.S. Pat. No. 9,623,564 (incorporated herein by reference in its entirety) describes using harmonic potential for steering a robotics platform from an initial point to a final one in an unknown environment. However, the method can only deal with physical obstacles. It is not equipped to incorporate signal strength in the motion generation process.

A synchronization procedure has been partially disclosed (see Ahmad A. Masoud, "A Harmonic Potential Approach for Simultaneous Planning and Control of a Generic UAV Platform", From the issue "Special Volume on Unmanned Aircraft Systems" of Journal of Intelligent & Robotic Systems: Volume 65, Issue 1 (2012), Page 153-173, incorporated herein by reference in its entirety). However, the procedure in the paper does not guarantee success when guidance is evolving under the influence of onboard sensory feedback.

Accordingly, it is one object of the present disclosure to provide a mobile robot, robotics communication system and/or robotic control method that includes a safety sensitizing stage thereby accommodating or permitting the capability to convert guidance correctly into an actuating signal and to avoid unintended contact with an obstacle or communication dead-zone detected while en route to a designated target position.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY OF THE INVENTION

A first aspect of the present disclosure provides a mobile robot including: a motion actuator; at least one detection sensor configured to detect field information in a movement field of the mobile robot; a guidance generation unit configured to generate a motion guidance policy to a target position from a current position, the motion guidance policy being updated by the guidance generation unit when the field information has been received from the at least one detection sensor; a safety sensitization unit configured to generate a safety sensitized policy which is the motion guidance policy with a reduced velocity magnitude relative to an angle between the motion guidance policy and the current motion of the mobile robot; and a motion actuation unit configured to determine an actuation signal for instructing the motion actuator to project the current motion of the mobile robot in conformity with the safety sensitized policy provided by the safety sensitization unit.

A second aspect of the present disclosure provides a method of navigating a mobile robot, including the steps of: detecting field information in a movement field of the mobile robot; generating a movement guidance policy to a target position from a current position; updating, when field information is detected in the detecting step, the motion guidance policy based on the detected field information; generating a safety sensitized policy by reducing the velocity magnitude of the movement guidance policy relative to an angle between the motion guidance policy and a current motion of the mobile robot; generating an actuation signal for actuating the motion of the mobile robot in conformity with the safety sensitized policy; and driving the mobile robot by way of the actuation signal.

A third aspect of the present disclosure provides a non-transitory computer-readable storage medium storing instructions to cause a computer to perform the steps of: detecting field information in a movement field of a mobile robot; generating a movement guidance policy to a target position from a current position; updating, when field information is detected in the detecting step, the motion guidance policy based on the detected field information; generating a safety sensitized policy by reducing the velocity magnitude of the movement guidance policy relative to an angle between the motion guidance policy and a current motion of the mobile robot; generating an actuation signal for actuating the motion of the mobile robot in conformity with the safety sensitized policy; and driving the mobile robot by way of the actuation signal.

The above aspects provide a mobile robot, a method of navigating a mobile robot, and a storage medium which allow for improved navigation and safety of travel in a mobile robotics platform. Another feature of the above aspects is the ability to maintain a good wireless signal strength profile along the trajectory to the target while maintaining substantially continuous movement. This enables the mobile robotics platform to send and receive data to and from a remote operator most if not all the time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The present disclosure describes an integrated procedure and system for steering a mobile robot 100 with nontrivial dynamics to a target zone in an unknown and unstructured environment while maintaining good wireless communication channel characteristics. The procedure ensures that a target position $X_T$ can be reached along a well-behaved path. It also ensures that hard obstacles (physical obstacles) and dead communication zones can be avoided even when physical obstacles and communication dead-zones are newly detected via onboard sensors 105, 106 while en route to a designated target position $X_T$. The procedure allows for a sufficiently simple design that is readily compatible with VLSI implementations and provides an actuation-friendly control signal that reduces energy consumption and stress on a motion actuator 140 of the mobile robot 100 being navigated. The procedure produces smooth, infinitely differentiable trajectories and generates motion that is intuitive and to a large extent predictable. The procedure keeps mission uncertainty under control.

Figure 1:
FIG. 1 illustrates a topography containing both hard obstacles and soft wireless signal strength fields.
Figure 2:
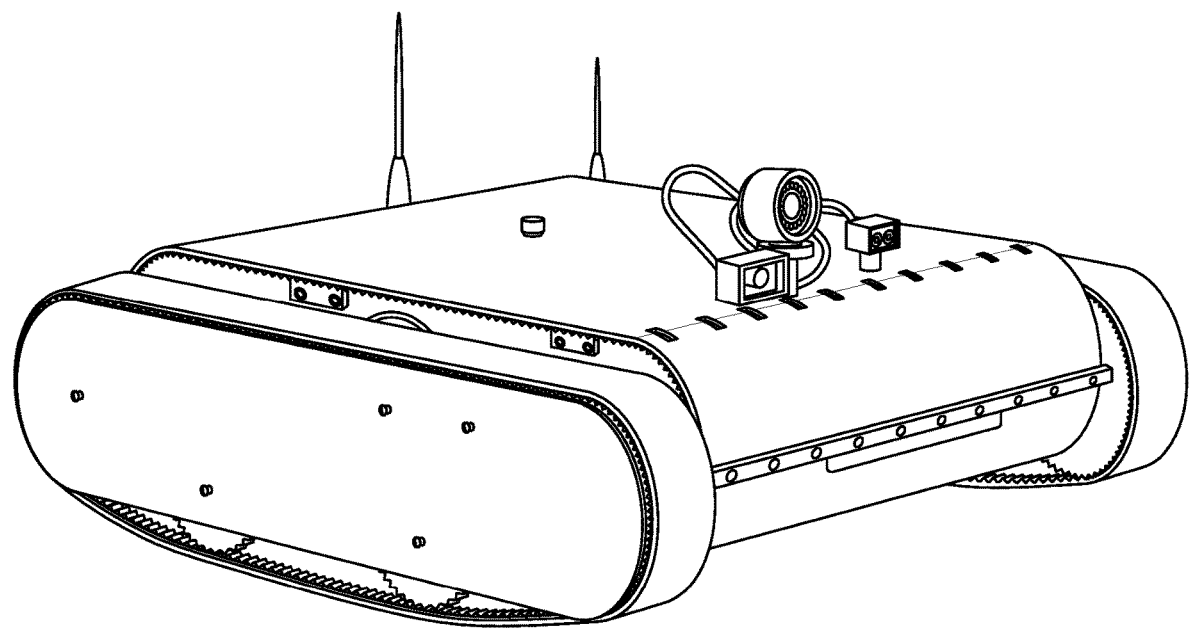
FIG. 2 illustrates an example of a differential drive robot used by first responders in emergency situations.

The guidance technique disclosed herein is capable of generating an actuation signal U(X) for the motion actuator 140 that realizes the above behavior for a wide class of robotics platforms described by the system equation (Equation 1), $$\frac{dX}{dt} = T(\lambda) \qquad (1)$$
$$\frac{d\lambda}{dt} = F(\lambda, U)$$

where X is the position vector of the robot and λ describes the local motion variables such as the orientation of the platform and its tangential speed. The above model accommodates a differential drive mobile robot 100, such as that shown as an example in FIG. 2, which is commonly used in first responder robotics. In other embodiments the robot may be a drone operating in three dimensions and/or not in direct contact with a ground surface. The following (Equation 2) shows the actuation of such a mobile robot 100, $$\begin{bmatrix} \dot{x} \\ \dot{y} \\ \dot{\theta} \\ \dot{v} \end{bmatrix} = \begin{bmatrix} v \cdot \cos(\theta) \\ v \cdot \sin(\theta) \\ u \\ a \end{bmatrix} \qquad (2)$$

where x and y are the coordinates of the robot's location, θ and v are the orientation and tangential speed of the robot respectively, u and a are the robot's control variables through which motion is actuated.

Exemplary embodiments of the present invention will be described below with reference to the drawings. In the drawings, the same elements are denoted by the same reference numerals, and thus redundant descriptions thereof are omitted as needed.

Exemplary Embodiment

Figure 3:
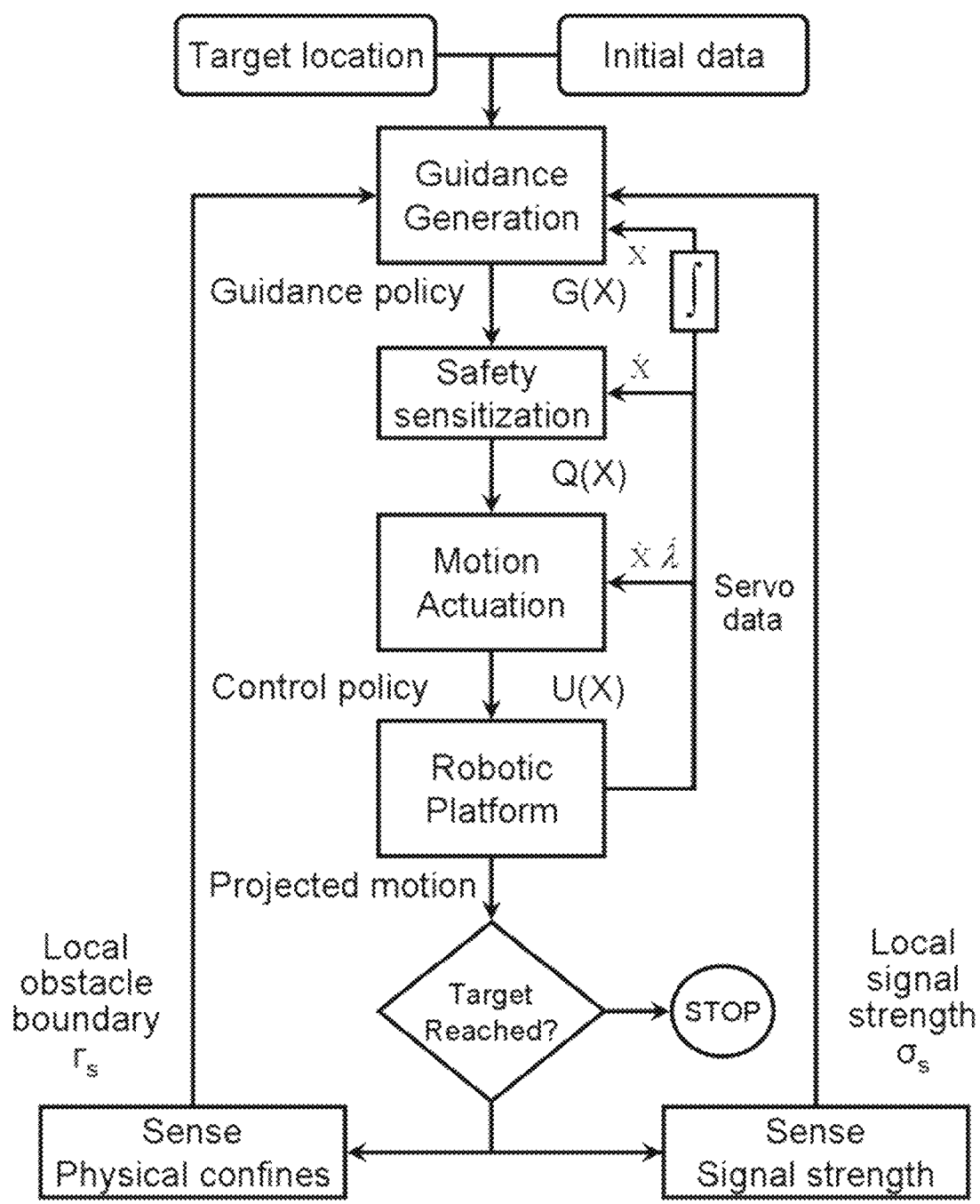
FIG. 3 is a flowchart illustrating the workflow of an embodiment of a communication-aware mobility process.

Hereinafter, an exemplary embodiment of the present disclosure will be given with reference to the drawings in terms of a mobile robotics platform (mobile robot 100). A workflow of components in an example procedure for this embodiment is shown in FIG. 3.

Mission data (including known topography or signal coverage, if available, and a target location) is input to a guidance generation unit 110 of the mobile robot 100. The guidance generation unit 110 converts the data into a guidance vector field G(X) (hereinafter also referred to as a "guidance policy") that marks, at each point in space, the direction along which motion should proceed if the target is to be reached in an efficient, communication-aware manner. The vector that lies at the current location of the mobile robot 100 is selected as the guidance vector.

Figure 20:
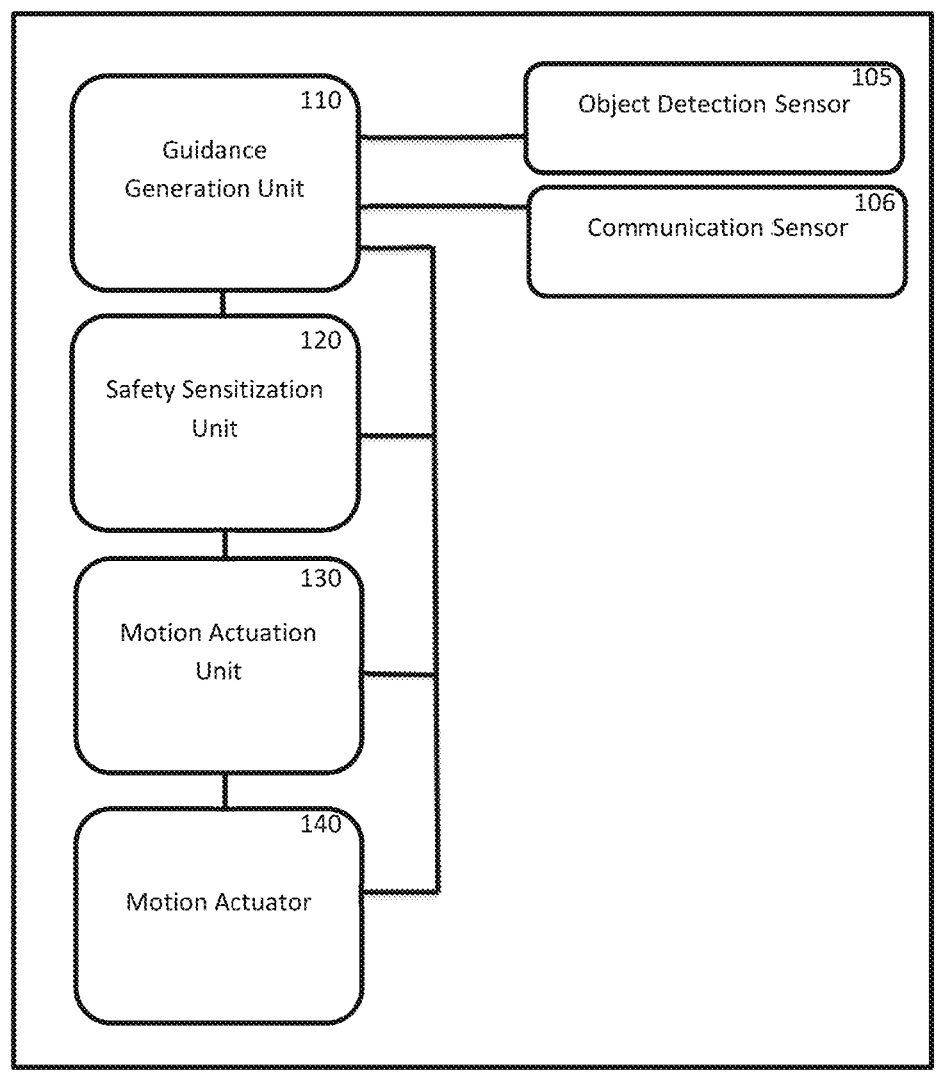
FIG. 20 illustrates a schematic diagram of an embodiment of a mobile robot of the present disclosure.

The mobile robot 100 of this embodiment has a number of sensors 105, 106 (see for example FIG. 20) onboard which are capable of detecting field information, for example, hard and soft obstacles. Hard obstacles γ may be, for example, physical obstructions in a potential path to the target position $X_T$, and soft obstacles σ may be, for example, areas to be favored or avoided based on high or low communication signal coverage, respectively. The sensors 105, 106 output detected field information to the guidance generation unit 110.

Figure 6:
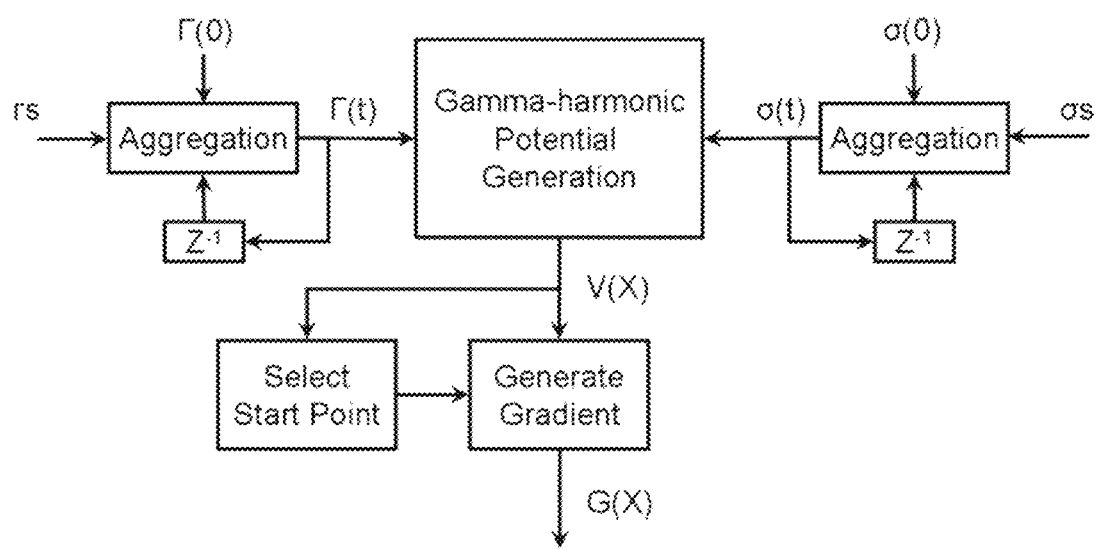
FIG. 6 is a flowchart illustrating components of an embodiment of a guidance module.

Here, the operations of the guidance generation unit 110 will be described in detail in accordance with the block diagram in FIG. 6.

Figure 5:
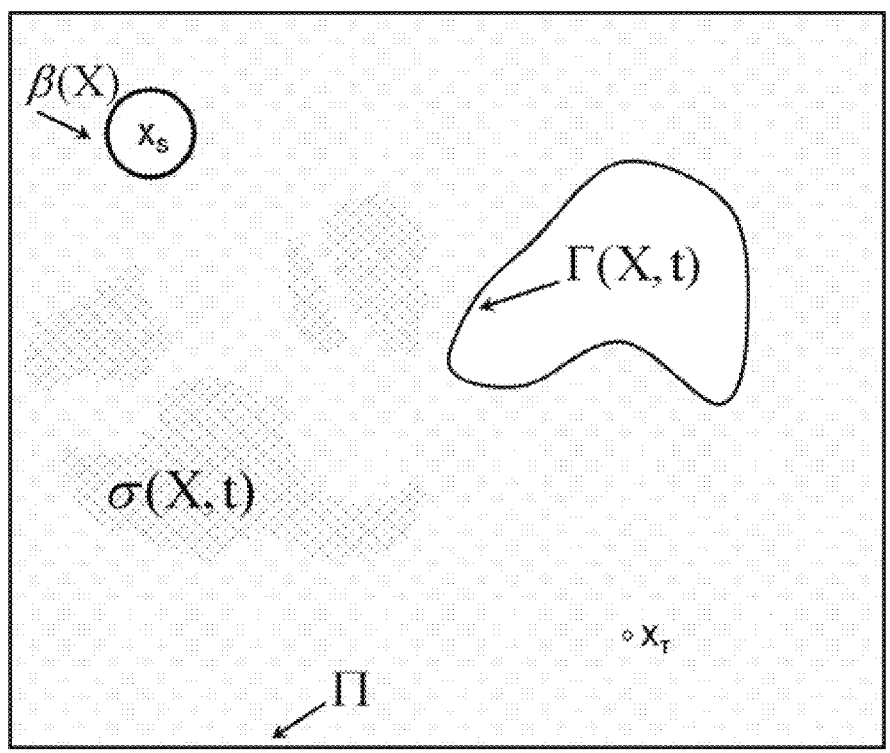
FIG. 5 illustrates an example of regions and variables used by a guidance module.

The vector guidance policy G(X) is generated from an underlying scalar potential field V(X) using the boundary value problem described in FIG. 5 as an example. The perimeter of operation (Η) is set so as to define the workspace (field of movement) in which the mobile robot 100 should operate.

If no information exists about physical obstacles (Γ) contained in the environment, then the hard obstacle description is initialized to the empty set Γ(0)=ϕ. Furthermore, if no information exists about signal strength in the field of movement, i.e., soft obstacles (σ) contained in the environment, then the signal strength is initialized to a small positive constant (σ(X,0)=ε).

In the case that field information about hard obstacles (Γs) is received from an obstacle detection sensor 105, the obstacle representation is adjusted such that Γ (X, t+dt)= Γ(X,t) ∪Γs).

Similarly, if field information about the signal strength field (σs) is received from a communication sensor 106, the region of the signal strength field that contains the update (Ωs) is filled with the sensed field (σ(X, t+dt)=σs(X) X ∈Ωs). The update should be performed such that the signal strength at the interface between the updated and existing regions is continuous.

The target location $X_T$ is specified along with the start location $X_S$, and a small circular region (β(X)) of radius δ is created with Xs as its center where (β(X)={X:|X−Xs|=δ}).

Next, the boundary value problem (Equation 3) is solved.

$$\nabla \cdot (\sigma \cdot \nabla V) = 0 \quad X \in \Pi - \Gamma \quad (3)$$

where, V(X)=1 X∈β, V($X_T$)=0, ∂V(X)/∂n=0 X∈Γ

The start point Xo on β is selected such that that |∇V(Xo)| is the highest. To move along a trajectory that would ensure that the target is reached while keeping good wireless channel characteristics, the reference velocity which motion has to proceed along is driven by the normalized negative gradient field of V starting from the point Xo $$\dot{X}r(X) = G(X) = -\frac{\nabla V(X)}{|\nabla V(X)|} X(0) = Xo \quad (4)$$

The generated guidance vector is passed to a conditioning stage (safety sensitization unit 120) that produces a safe guidance vector (hereinafter also referred to as a "safety sensitized policy"). Safety is factored into the guidance signal based on the relative angle between the actual speed (current speed) of the mobile robot 100 and the guidance vector. In the case that no new field information (i.e., physical obstacles or change in communication signal strength) is detected by the onboard sensors 105, 106 of the mobile robot 100, the guidance policy remains static and the safety sensitization simply outputs the guidance policy with no significant modification.

However, if new field information is detected by the onboard sensors 105, 106, the guidance generation unit 110 appropriately updates the guidance policy G(X). This update to the guidance policy may likely cause a misalignment between the actual traveling speed (in accordance with the previous guidance policy) and the newly generated guidance policy. The bigger this misalignment is, the bigger is the risk that the robot will collide with an obstacle or move into a region with poor communication characteristics. It is reasonable to order the robot to slowdown if the robot projects motion that is significantly different from what is being told to project (even stop if it is going in the opposite direction). If there is a good alignment between motion and the commands given, then the robot can proceed at full speed. This idea enables the controller to effectively enforce compliance of the robot's motion with the guidance signal hence enhancing mission safety in terms of collision and communication-outage avoidance.

Therefore, the safety sensitization unit 120 reduces the velocity magnitude of the guidance policy such that a smooth and continuous reorientation of travel can be made and the mobile robot 100 does not, for example, collide with a newly detected obstacle or cross into a communication dead zone due to a sudden change in the guidance policy.

Figure 4:
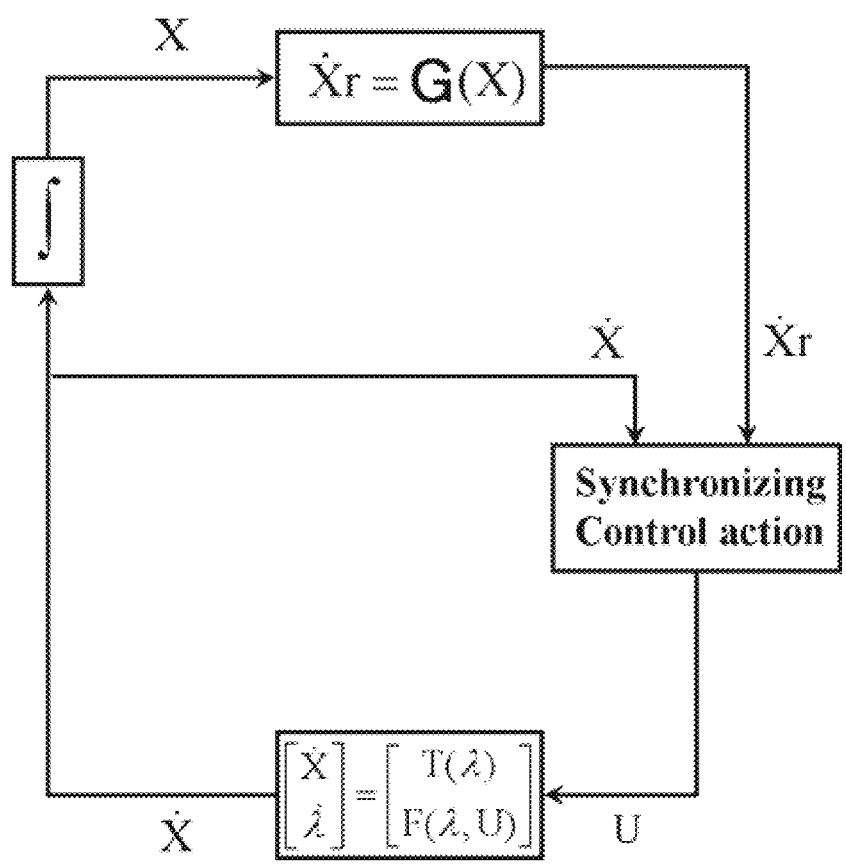
FIG. 4 illustrates an example of coupling between a guidance module and a robotics agent through velocity synchronization.

The guidance policy is converted into an equivalent navigation control signal by treating the guidance vector as an imaginary reference velocity (FIG. 4). The safety sensitization process aims to align the guidance vector with the velocity vector of the mobile robot 100 and allows for opportunistically exploiting information with minimal disruption to existing plan of action. This ensures the conversion of the guidance vector into a control signal when full information is available and the guidance field is not changing with time. The safety conditioning makes it possible to do such a conversion when the guidance field is evolving under the influence of sensory feedback.

Here, the operations of the safety sensitization unit of this embodiment will be described in detail.

Figure 7:
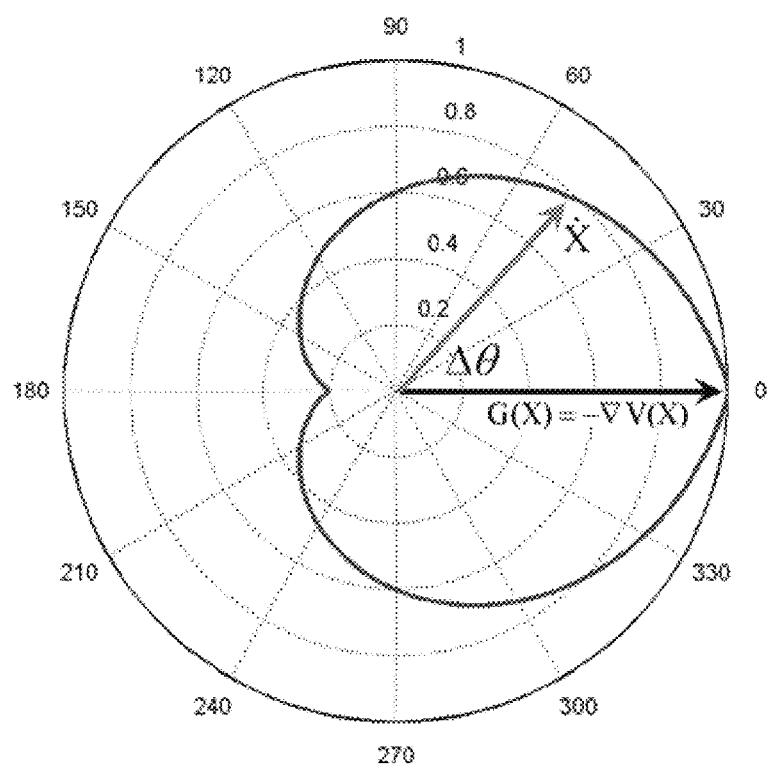
FIG. 7 illustrates safety sensitization of the guidance signal by making the magnitude of the tangential reference speed dependent on the relative location of the actual speed of the robot.

When full information is available and the guidance policy is static, the mobile robot 100 exactly traverses the guidance trajectory if the initial velocity of the mobile robot 100 and the initial gradient guidance field are in phase. It is possible to still ensure the compliance of the mobile robot 100 with the guidance policy without having to stop and re-orient itself each time a sensory update is received. This is carried-out by modulating the magnitude of the guidance field with a positive factor (see FIG. 7) of a maximum value 1 and minimum value b. This factor basically reduces the velocity magnitude of the robot proportional to the error in alignment. Thus, gradually as the robot realigns with the gradient guidance field, the factor starts approaching 1. If the velocity magnitude is not modulated, the error in alignment increases especially for paths that have sharp turns.

The following normalized dot and cross products are constructed by the safety sensitization unit 120 using the guidance policy output by the guidance generation unit 110 and the actual speed (current motion vector).

$$DP = \frac{(\dot{X}(X)) \circ (-\nabla V(X))}{|\dot{X}(X)||\nabla V(X)|}, \; CP = \frac{(\dot{X}(X)) \times (-\nabla V(X))}{|\dot{X}(X)||\nabla V(X)|} \quad (5)$$

A variable η is constructed in accordance with:

$$\eta = \begin{bmatrix} CP & \text{if } DP > 0 \\ \text{sign}(CP) & \text{if } DP \leq 0 \end{bmatrix} \quad (6)$$

A scaling factor c is constructed in accordance with:

$$c = (1-b) \cdot (1-|\eta|) + b \quad (7)$$

The resulting scaled guidance signal Q(X) which is output to the motion actuation unit 130 as the safety sensitized policy is:

$$Q(X) = -c \cdot \frac{\nabla V}{|\nabla V|} \quad (8)$$

Figure 8:
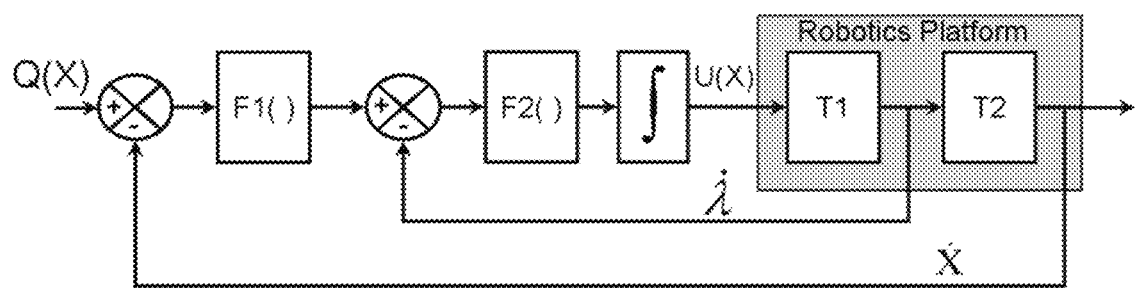
FIG. 8 illustrates a block diagram of an embodiment of a method used to convert the safety-sensitized guidance signal into a control signal.

Next, the operations of the motion actuation unit 130 of the present embodiment will be described in accordance with the example block diagram shown in FIG. 8. The conversion of the communication aware guidance signal into an equivalent actuation signal can instruct the mobile robot's actuators of motion to project an action that is in conformity with guidance.

The following procedure may be calculated in the motion actuation unit 130 and used for the conversion. First, the difference between the safety-sensitized guidance signal and the actual tangential speed of the agent is calculated and scaled with a tunable positive constant K1 which gives a first error signal E1.

$$E1 = K1 \cdot (Q(X) - \dot{X}) \quad (9)$$

Next, this error in the workspace domain is converted to a guidance signal in the configuration space domain using the Jacobian matrix computed as F1.

$$F1 = \frac{\partial T(\lambda)}{\partial \lambda} \quad (10)$$

Thereafter, the error in configuration space E2 is obtained using the transformed error as the 'guidance' signal in configuration space. The error in local coordinates is multiplied by another tunable positive constant K2.

$$E2 = K2 \cdot (F1^T \cdot E1 - \dot{\lambda}) \quad (11)$$

The Jacobian matrix, given below, then transforms the error in the configuration space guidance to the derivative of the control signal as F2.

$$F2 = \frac{\partial F(\lambda, U)}{\partial U} \quad (12)$$

The derivative of the actuation signal is then computed as:

$$\dot{U} = F2^T \cdot E2 \quad (13)$$

The actuation signal is computed by integrating its derivative $$U(t) = \int_0^t \dot{U} \cdot dt \quad (14)$$

The control signal U(X) is then fed to the mobile robot 100 in order to actuate motion that results in the robot moving along the gradient of the potential field obtained as part of the guidance stage, and the sensory data collected by the sensors 105, 106 are fed to the guidance generation unit 110 for processing. When the mobile robot 100 reaches the target position $X_T$, the mobile robot 100 stops, at which time a new target position $X_T$ may be assigned as necessary.

The above exemplary embodiment is described in terms functional units implemented in hardware included in a mobile robotics platform. These functional hardware units may be implemented in such a way as to be individual from one another or integrated with one another, sharing like components such as logic processing and memory storage resources, as necessary, and is not particularly limited as long as the functional hardware units are able to perform the functions as taught in this disclosure. It should also be clear to persons of skill in the art that the procedures performed by the functional units may also be performed in the steps of a method or as software instructions implementing equivalent functions of the hardware units to achieve the advantageous effects of the present disclosure.

Experimental Results

Figure 9:
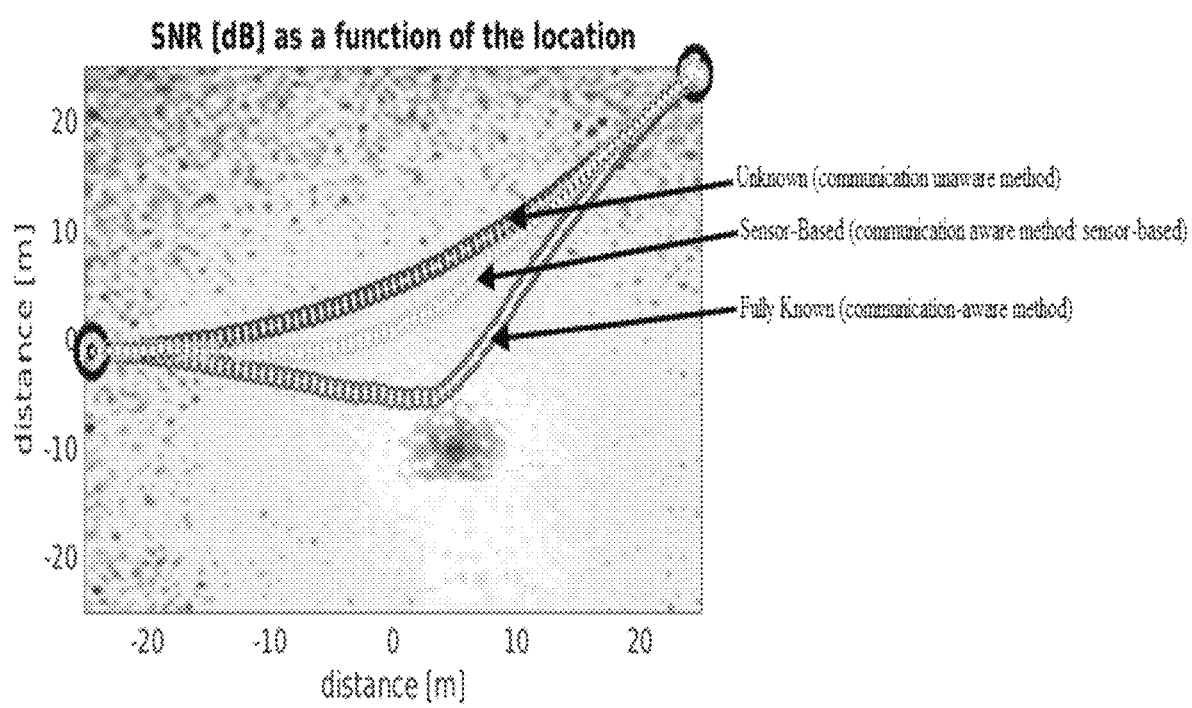
FIG. 9 illustrates a comparison of trajectories generated by: a communication unaware method, communication-aware method, and sensor-based communication aware method.
Figure 10:
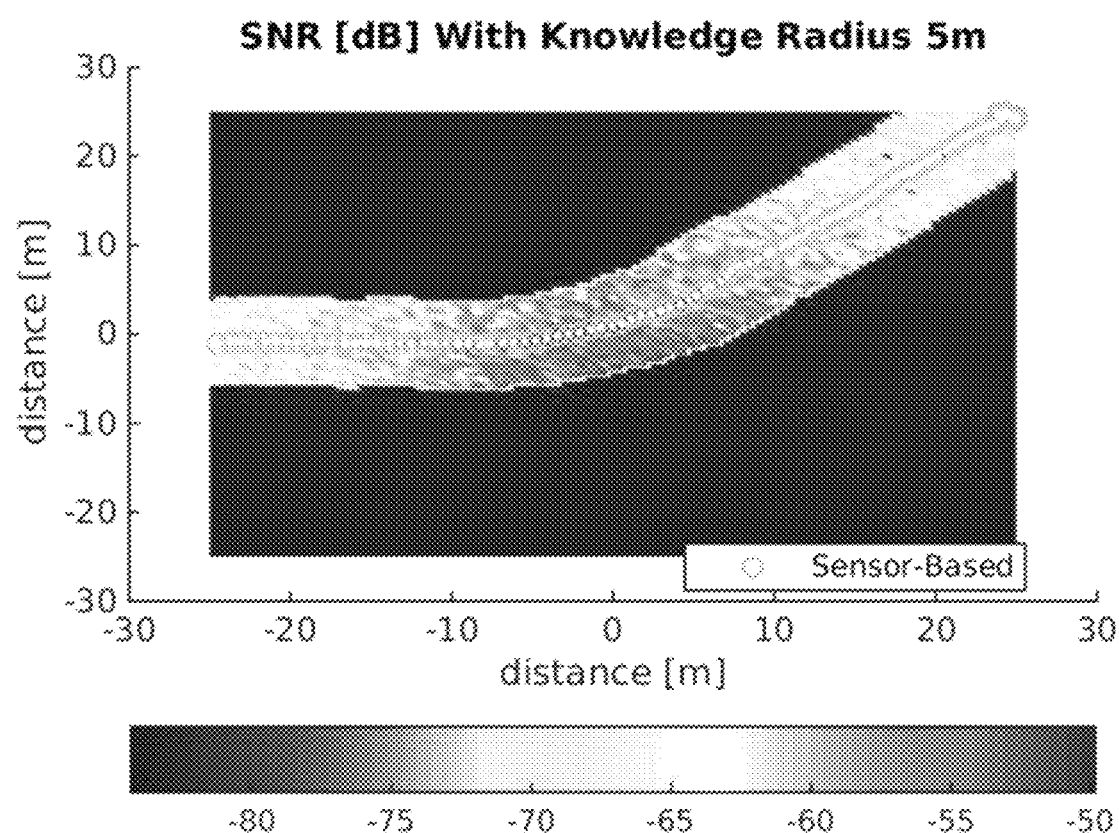
FIG. 10 illustrates communication-aware, sensor-based trajectory along with the partial signal strength information used in generating the trajectory.
Figure 11:
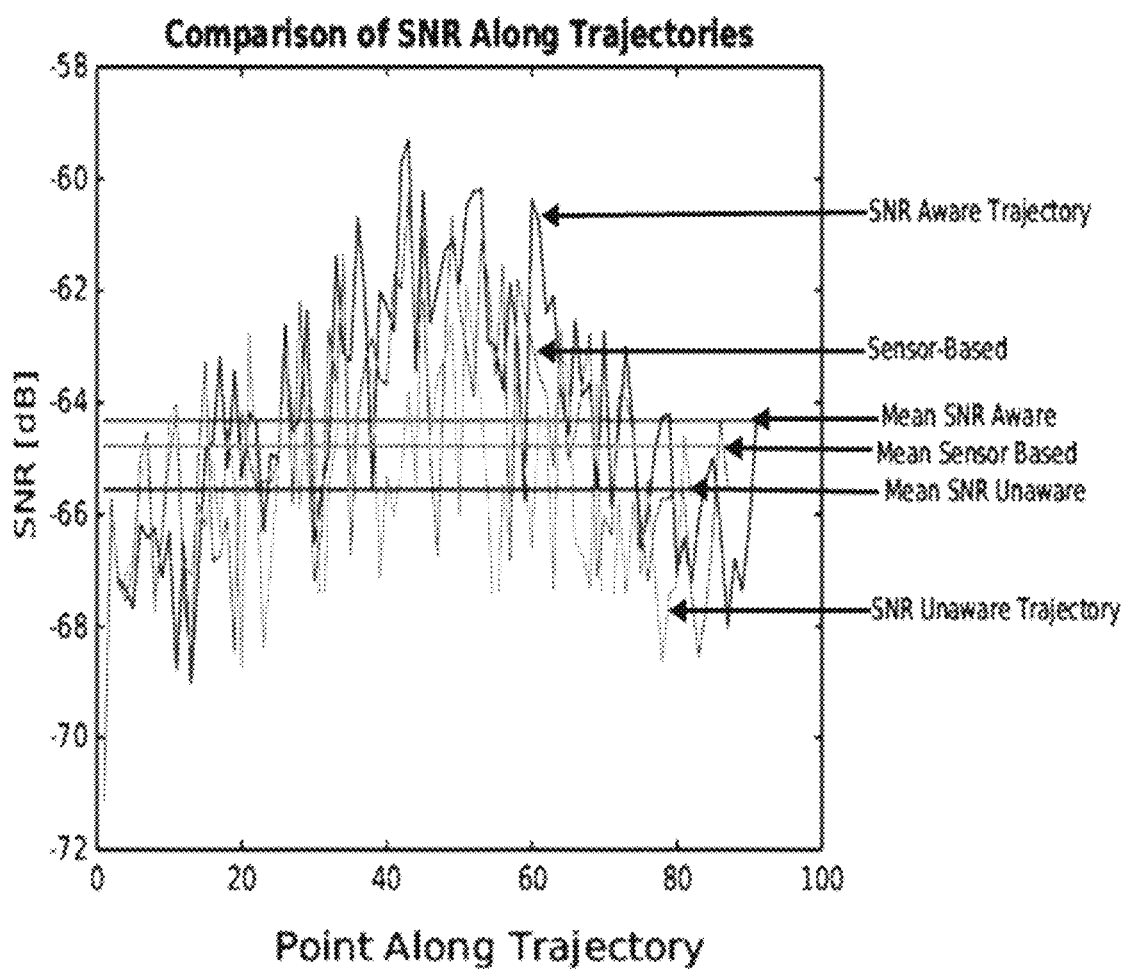
FIG. 11 illustrates signal strength profile along the different trajectories of FIG. 9 along with their mean values.

This section provides basic results that demonstrate basic capabilities of the present procedure. FIG. 9 shows three trajectories connecting a starting point to a target in free space that contains one transmitter. Three trajectories were generated to the target. The first trajectory (blue line) was generated in a communication unaware manner by setting the communication signal strength field σ to a constant value. The other two were generated using the communication-aware method disclosed herein. The red trajectory was generated using full information about the signal strength field and the other using partial information contained in a 5-meter radius (FIG. 10). As can be seen, the communication aware trajectories favored the high signal-to-noise ratio (SNR) regions with modest increase in the paths' lengths. FIG. 11 shows the SNR profile along each of these trajectories.

Figure 12:
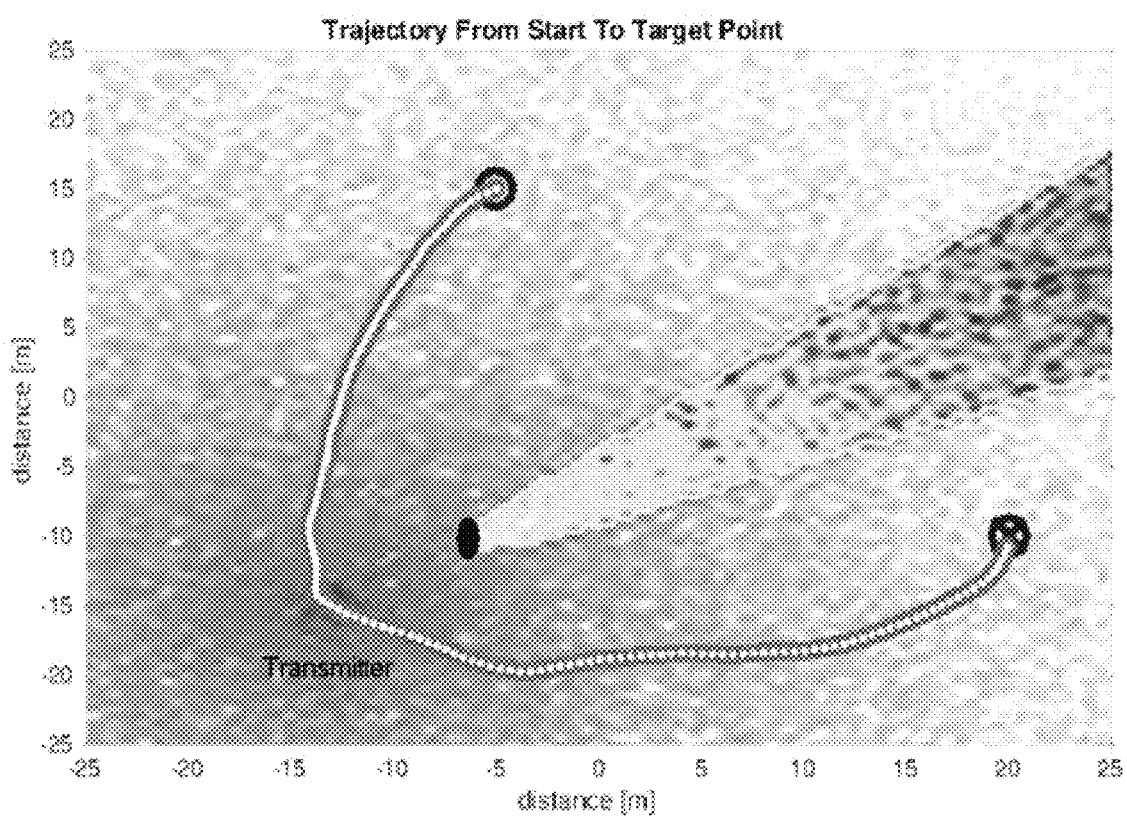
FIG. 12 illustrates SNR shadowing caused by a small object.

The advantages of the present technique become salient when the environment contains clutter. Clutter causes many artifacts that are detrimental to the signal strength field which could even cause outage (RF shadows) in some parts of the environment. FIG. 12 shows an environment that contains a transmitter and a small object. The object is causing an RF shadow region of low SNR values to appear. The communication aware trajectory generation method is used with full information about the SNR field to generate a path from a start point to a target point. As can be seen, the method abandons the direct shortest path that passes through the low SNR region and instead generates a path with sufficient length that remains inside the high SNR region.

Figure 13:
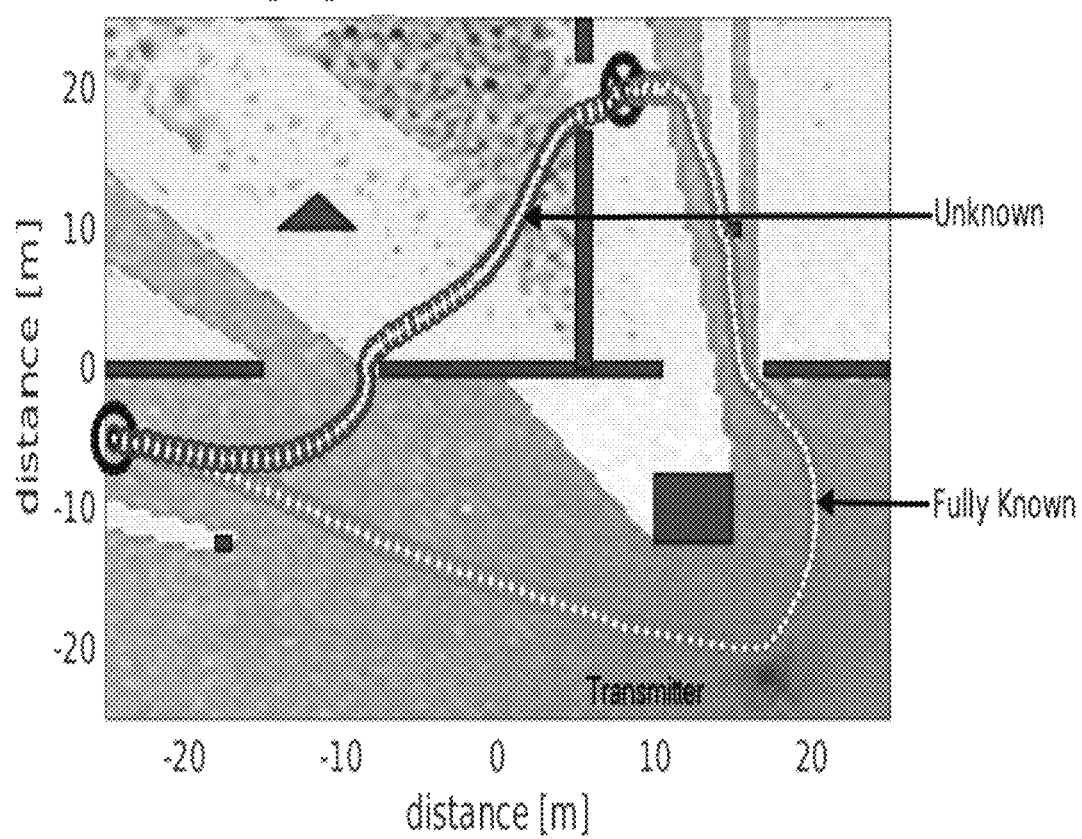
FIG. 13 illustrates an example of communication-aware and communication-unaware trajectories in a highly cluttered environment with a single transmitter.
Figure 14:
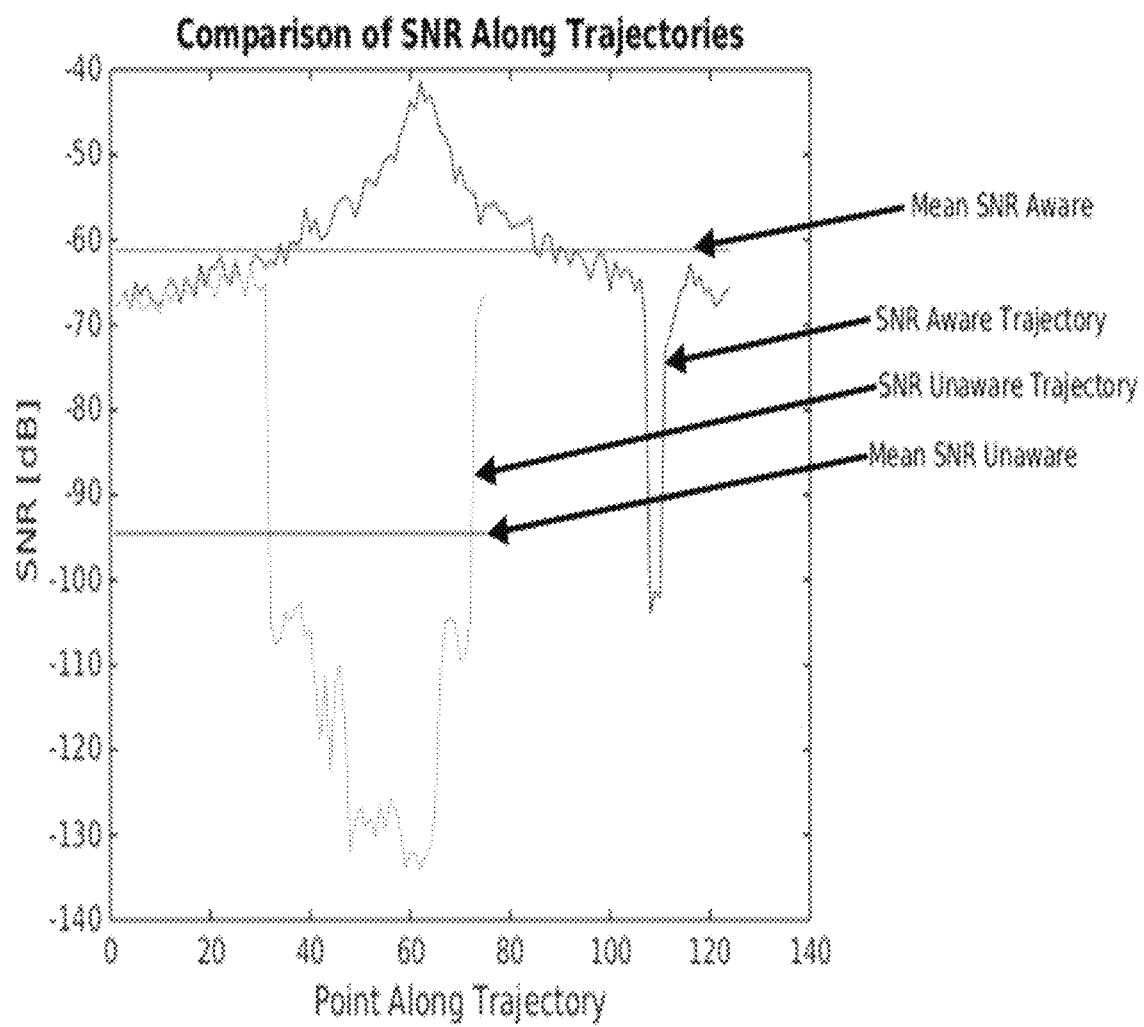
FIG. 14 illustrates the SNR profile along both paths of the example in FIG. 13.

The same behavior of the method is observed even when the clutter becomes more geometrically complicated. FIG. 13 shows a cluttered environment with one transmitter. It also shows the communication unaware path (blue line) and the communication aware path (red line). While both paths avoided collision with obstacles, the communication unaware path passed through communication dead-zones. The communication aware trajectory exhibited a modest increase in the path length and remained in the high SNR region. FIG. 14 shows the SNR profile along each path and a gain in average signal strength of about 35 dB.

Figure 15:
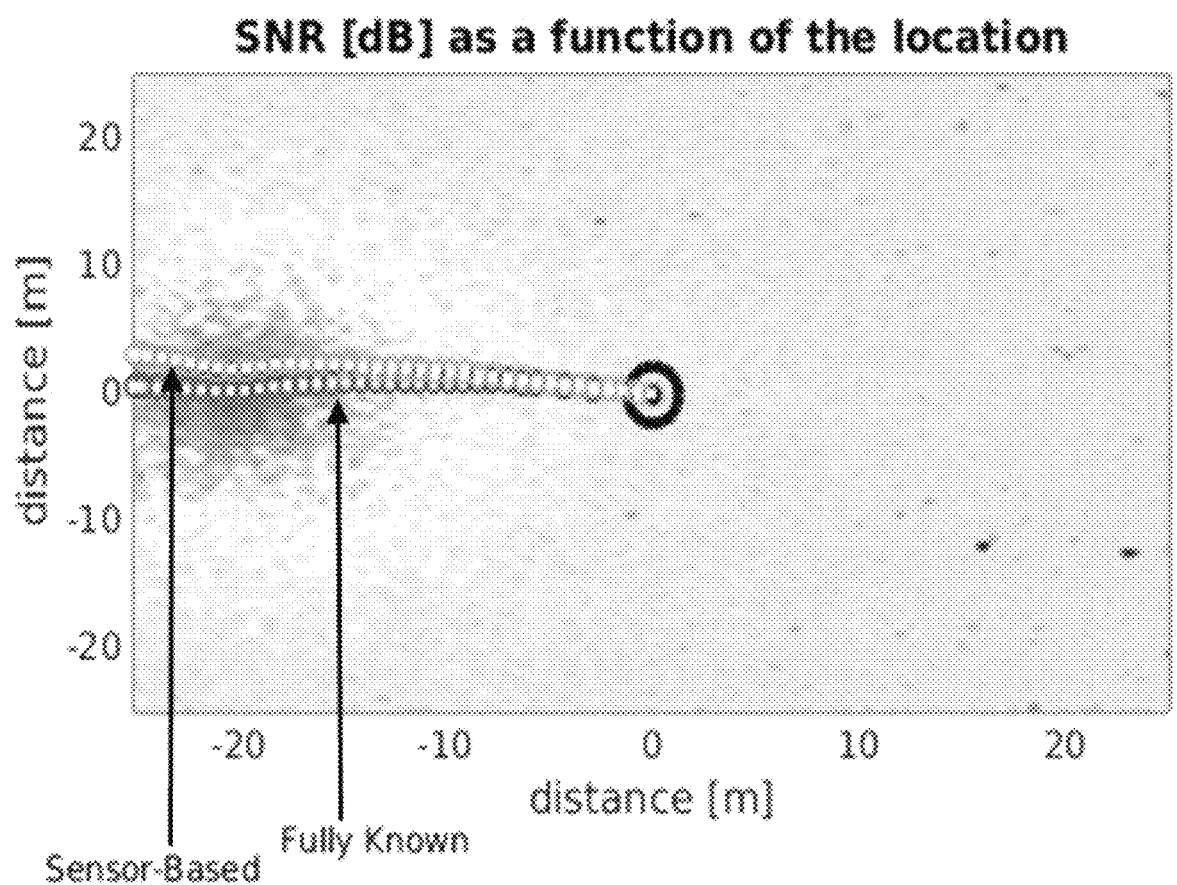
FIG. 15 illustrates an example of transmitter tracking.
Figure 16:
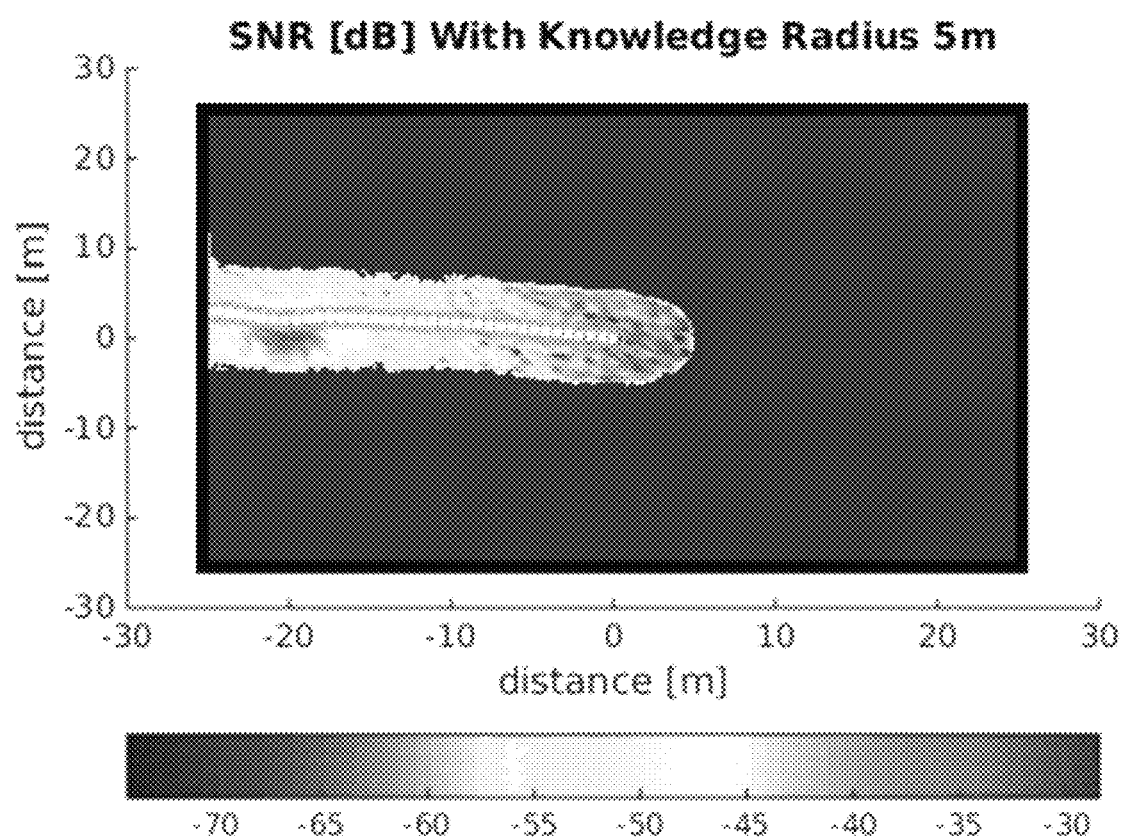
FIG. 16 illustrates an example of sensor-based transmitter tracking.

The example in FIG. 15 demonstrates the ability of the method to locate transmitters. The figure shows two paths, one uses full information about the signal strength field and the other uses only sensor-based information in a 5-meter radius (FIG. 16). Both paths were able to accurately locate the transmitter with almost identical performance.

This example demonstrates the ability of the suggested method not only to generate a communication-aware reference trajectory but to also generate the actuation signal that can correctly actuate communication-aware motion in an agent. A three-dimensional agent (14) with complex nonlinear dynamics and redundant actuation (u1, . . . , u6) is used to demonstrate this feature.

$$\dot{x}=v\cdot C\varphi C\theta$$

$$\dot{y}=v\cdot S\varphi S\theta$$

$$\dot{z}=v\cdot C\theta$$

$$\dot{v}=u_1\cdot u_4$$

$$\dot{\theta}=\cos(u_2)+u_3^2+u_5$$

$$\dot{\varphi}=\cos(u_2)\sin(u_4)+u_6 \quad (14)$$

Figure 17:
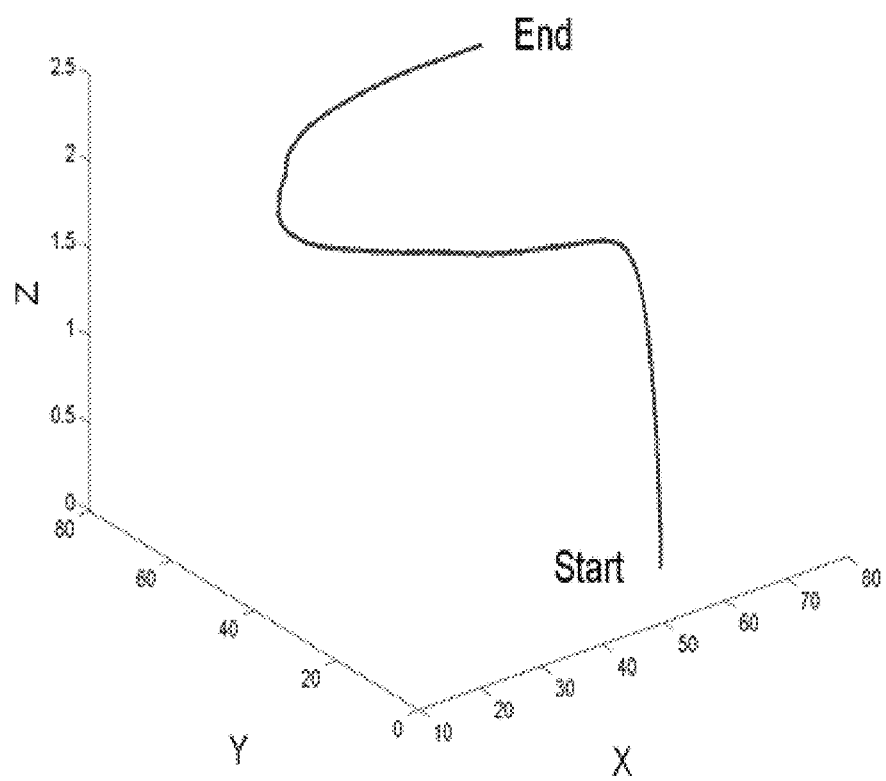
FIG. 17 illustrates an example of a 3D trajectory of an agent.
Figure 18:
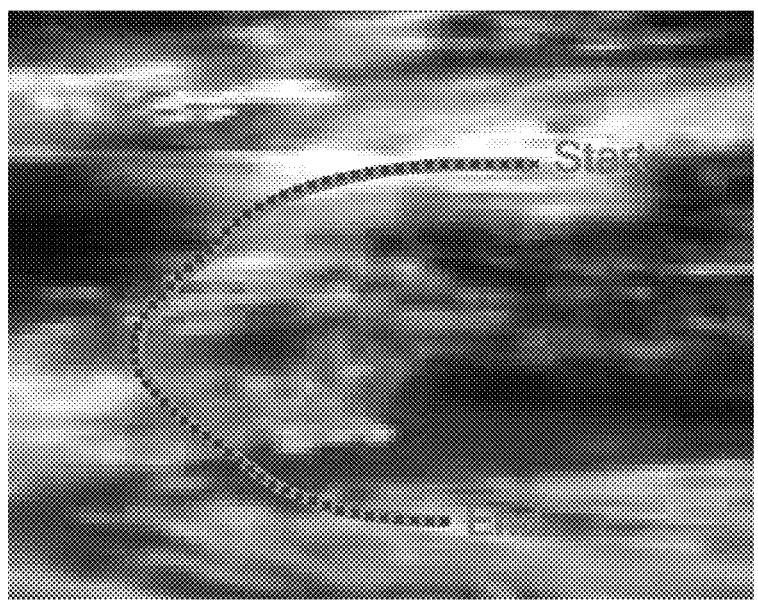
FIG. 18 illustrates an example of kinematic reference trajectory (blue) and actuated dynamic trajectory (red)
Figure 19A:
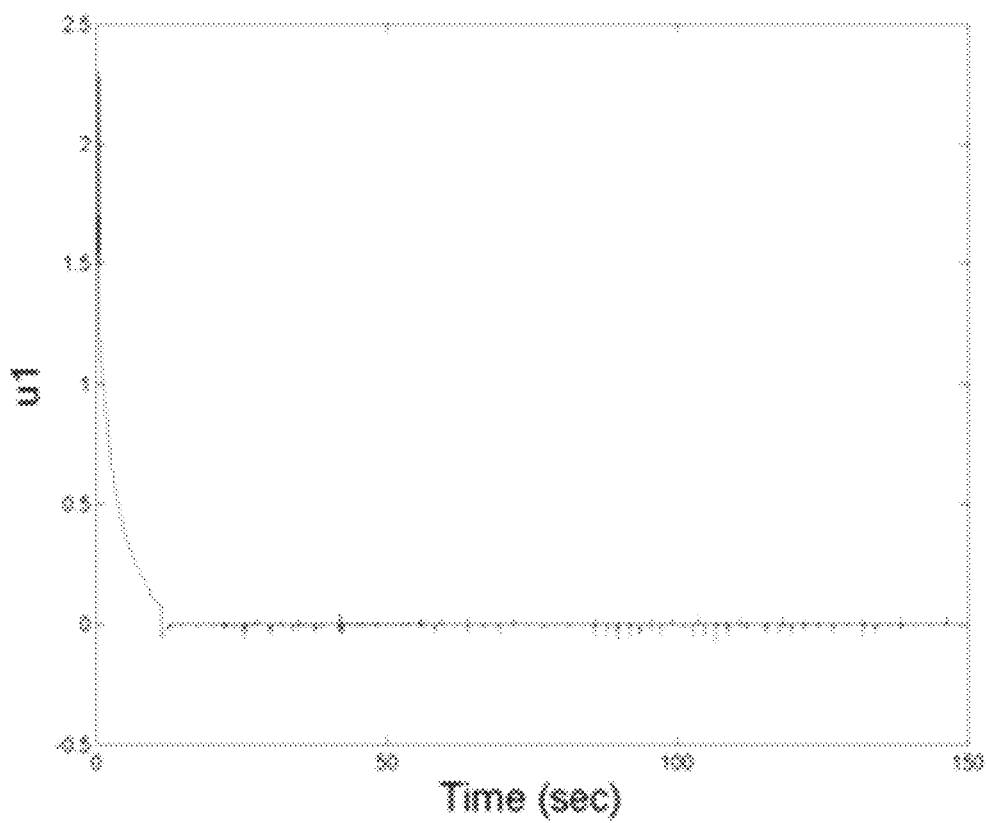
FIG. 19A illustrates a control signal, u1, corresponding to the trajectory of the example in FIG. 17.
Figure 19B:
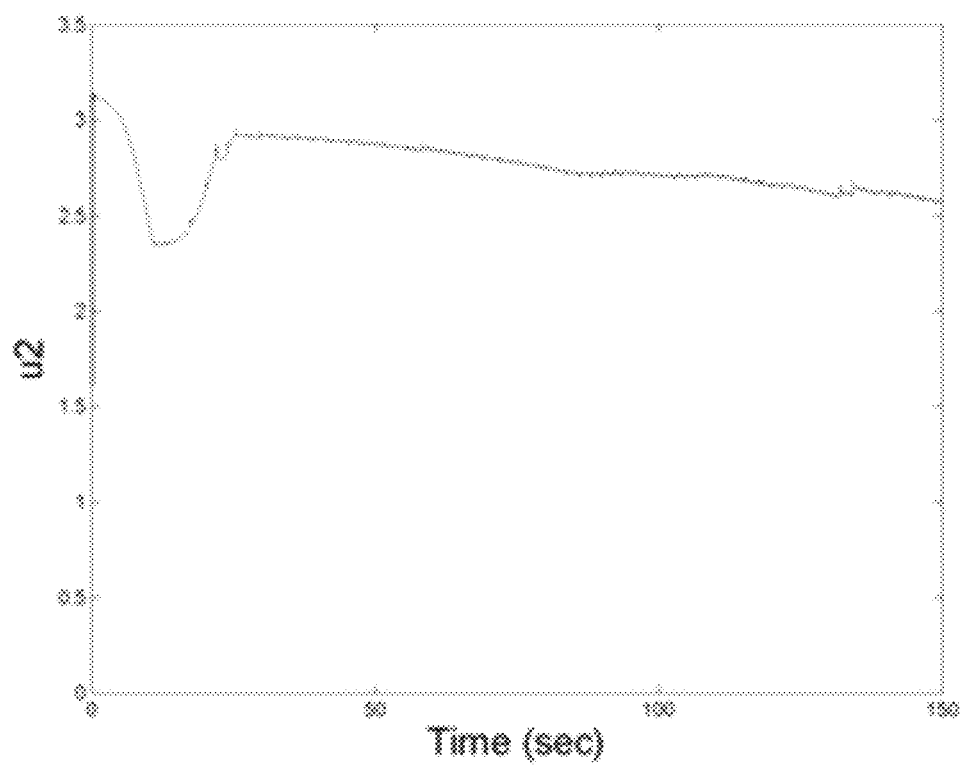
FIG. 19B illustrates a control signal, u2, corresponding to the trajectory of the example in FIG. 17.
Figure 19C:
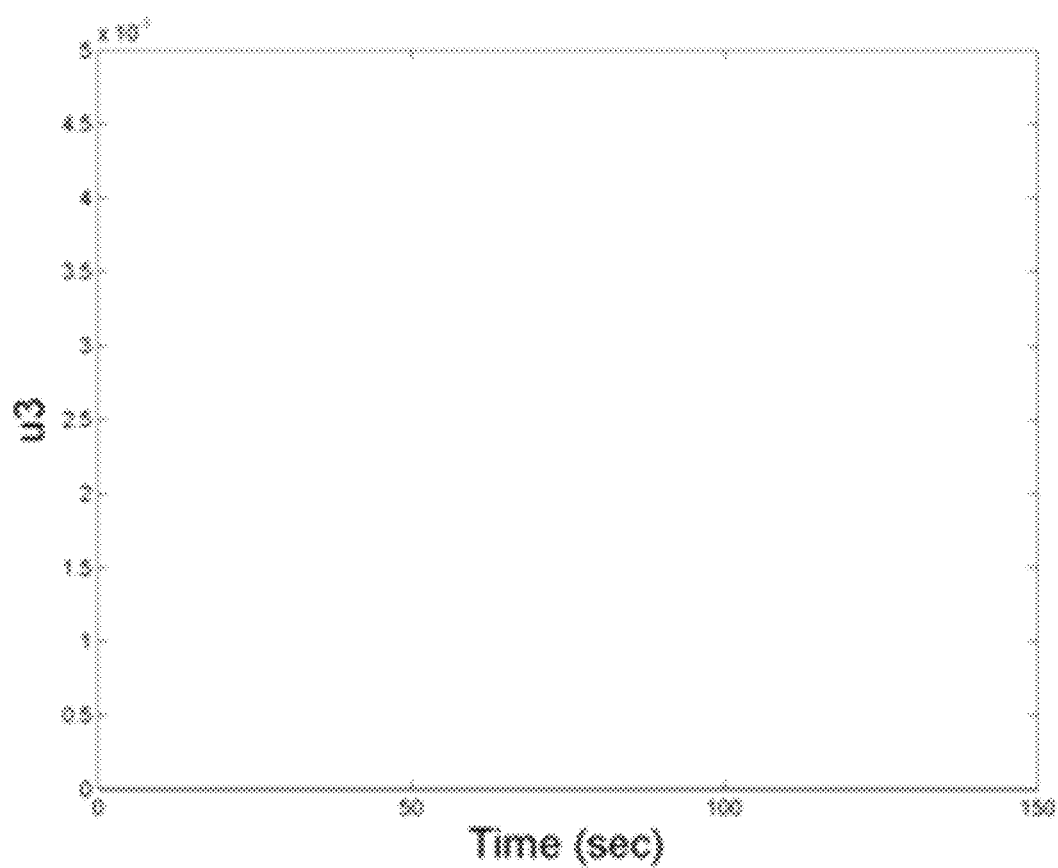
FIG. 19C illustrates a control signal, u3, corresponding to the trajectory of the example in FIG. 17.
Figure 19D:
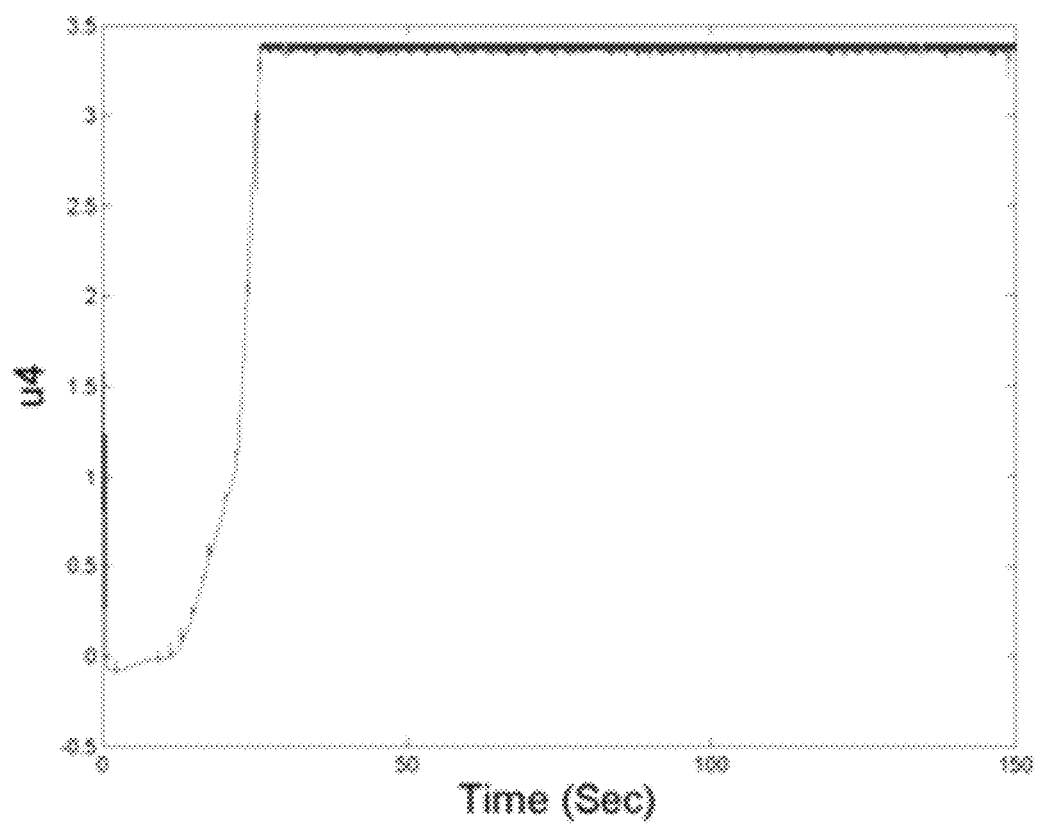
FIG. 19D illustrates a control signal, u4, corresponding to the trajectory of the example in FIG. 17.
Figure 19E:
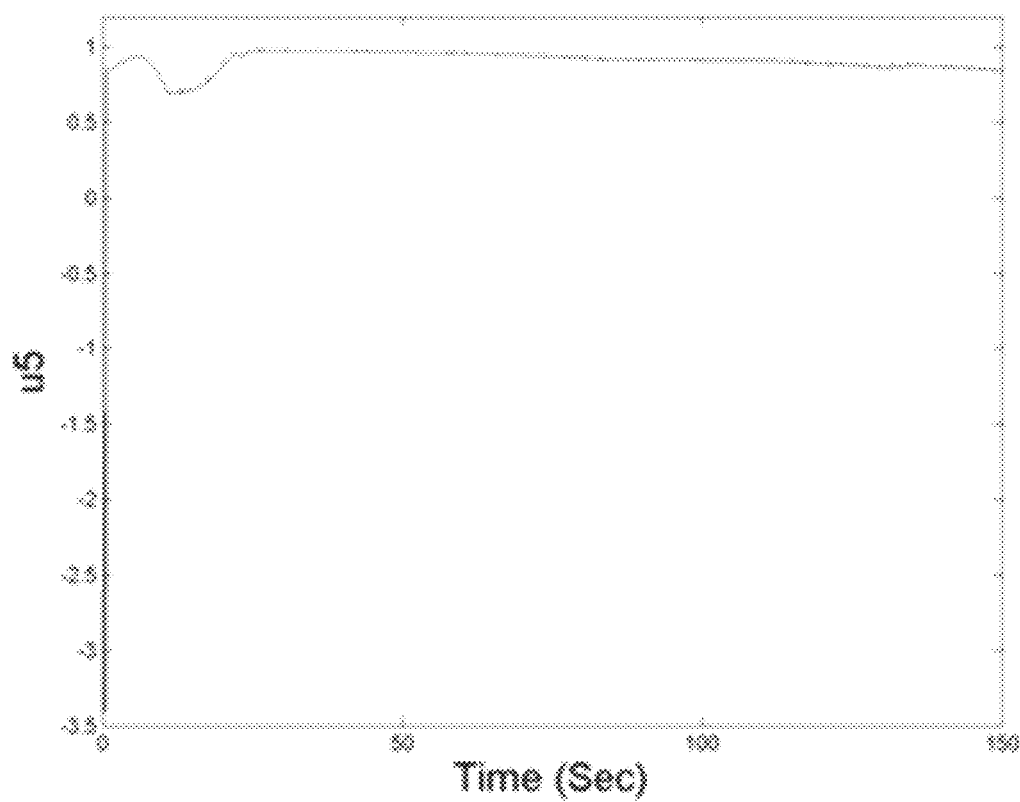
FIG. 19E illustrates a control signal, u5, corresponding to the trajectory of the example in FIG. 17.
Figure 19F:
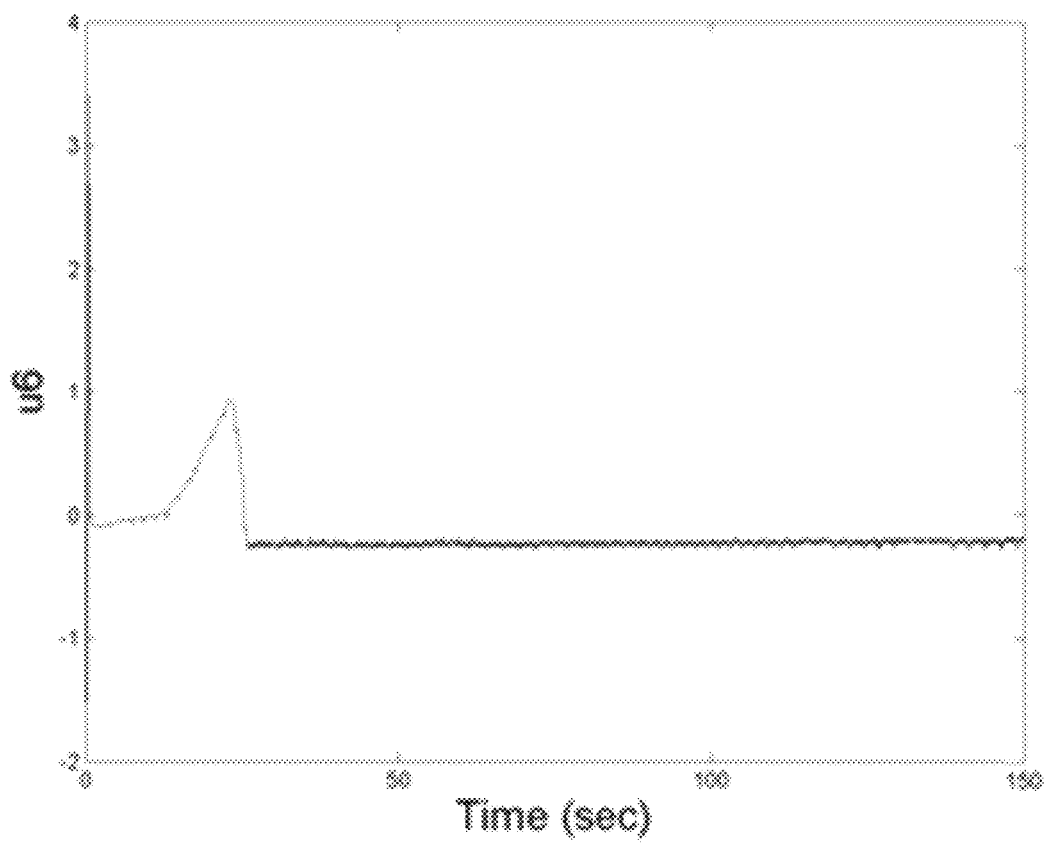
FIG. 19F illustrates a control signal, u6, corresponding to the trajectory of the example in FIG. 17.

The agent is required to synthesize the control signal that moves it from a start point to a target point while increasing its elevation from zero to two along the z-axis. The agent must maintain a good position during the execution of the task. The actuated 3D trajectory is shown in FIG. 17. The projection of both the reference trajectory (blue) and actuated trajectory (red) on the X-Y plane are superimposed on the utility map. As can be seen the actuated path is almost identical to the reference path. Both of them remain effectively confined to the region with high utility value. The control signals generating this trajectory are shown in FIGS. 19A-19F for control signals u1-u6 respectively. As can be seen, they are all bounded and well-behaved. The signals $u_1$-$u_6$ shown in FIGS. 19A-19F are control signals for a fixed wing UAV given by the following dynamic model. Where x, y and z are its spatial coordinates, v is its linear velocity and $\theta$ & $\varphi$ represent the orientation of the UAV in 3-D space (see Eq. 14 above).

It should be apparent from the foregoing that numerous modifications and variations of the present disclosure are possible in light of the above teachings. It is therefore to be understood that within the scope of the appended claims, the invention may be practiced otherwise than as specifically described herein.

For example, the mobile robot 100 of the exemplary embodiment is a differential drive robot; however, the techniques for navigating the mobile robot 100 disclosed herein could appropriately be applied to, for example, an aquatic or aerial drone. The guidance field may be converted to a control field suitable for practical robotics platforms, and the actuation signal may be appropriately modified to accommodate any type of robotics platform as well.

Further, in the description of the operation of the mobile robot 100, a target position $X_T$ is selected and the mobile robot 100 continues to the target location until the target location is reached. However, it is also possible for a remote operator to change the target location while the mobile robot 100 is en route before the target location is reached. In such a situation, similar to when new field information is received by the mobile robot's sensors, the guidance policy would necessarily be updated which may cause a need for safety sensitization of the guidance policy. Therefore, safety sensitization of the guidance policy is useful for any situation in which the guidance policy and the actual traveling vector may become misaligned.

In addition, the disclosed operations are compatible with allowing a remote user to assume full control of motion, influence the motion, or totally leave the decision on motion to the mobile robot 100 during operation. Such features may be included, as necessary, according to design requirements.

A global positioning system (GPS) sensor may be implemented into the robotics platform but is not required for the operations disclosed herein. Even in the absence of a global coordinate system, the mobile robot 100 can efficiently function in a local, self-referential coordinate system and can instruct a user how to locate itself in space, for example, to improve wireless reception. Also, the mobile robot can be used to approximately locate wireless transmission sources using local sensing of signal strength.

Both slow and fast fading may be accommodated in the steering process, and in the case of fast fading, it is possible to transmit servo-grade signals over wireless channels, if necessary.

In addition, the disclosed procedure allows an agent to move to a target located amidst clutter along a short path that has good wireless reception characteristics when no information about the field of movement is available in advance and the agent is obtaining spatial and wireless signal strength information locally; however, information about the field of movement may be provided in advance, further improving the efficiency of guidance even if the field information is partial or inaccurate. In the case of partial or inaccurate field information, improvement of performance is close in quality to that when information is fully available.

The exemplary embodiment above utilizes both an obstacle detection sensor and a communication sensor, but may also operate with merely one or the other, for example, only accommodating spatial information and ignoring signal strength information.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 21.

Figure 21:
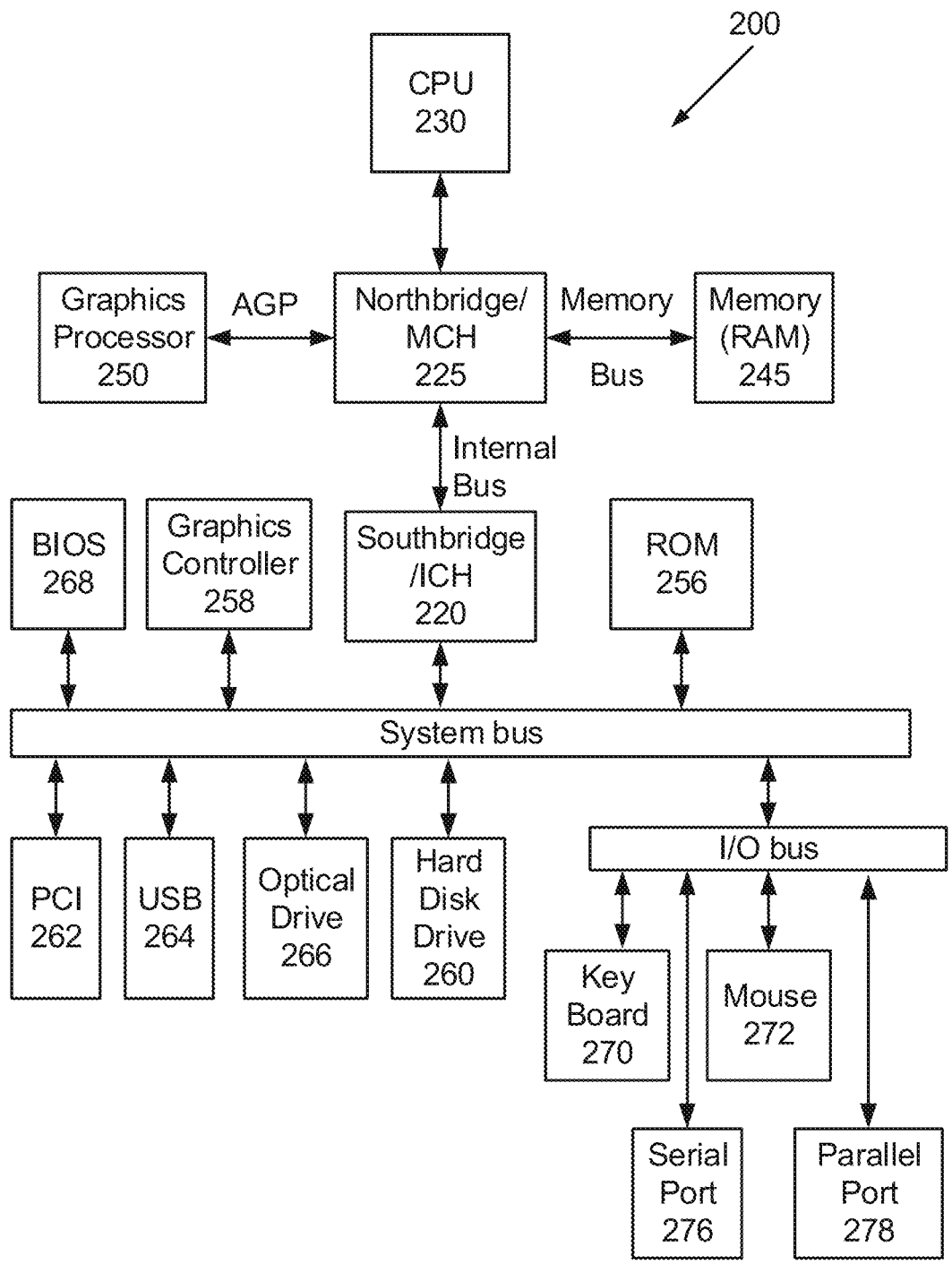
FIG. 21 illustrates an example of a schematic diagram of a data processing system for performing navigation of the mobile robot.

FIG. 21 shows a schematic diagram of a data processing system, according to certain embodiments, for performing navigation of the mobile robot. The data processing system is an example of a computer in which code or instructions implementing the processes of the illustrative embodiments may be located.

In FIG. 21, data processing system 200 employs a hub architecture including a north bridge and memory controller hub (NB/MCH) 225 and a south bridge and input/output (I/O) controller hub (SB/ICH) 220. The central processing unit (CPU) 230 is connected to NB/MCH 225. The NB/MCH 225 also connects to the memory 245 via a memory bus, and connects to the graphics processor 250 via an accelerated graphics port (AGP). The NB/MCH 225 also connects to the SB/ICH 220 via an internal bus (e.g., a unified media interface or a direct media interface). The CPU Processing unit 230 may contain one or more processors and even may be implemented using one or more heterogeneous processor systems.

Figure 22:
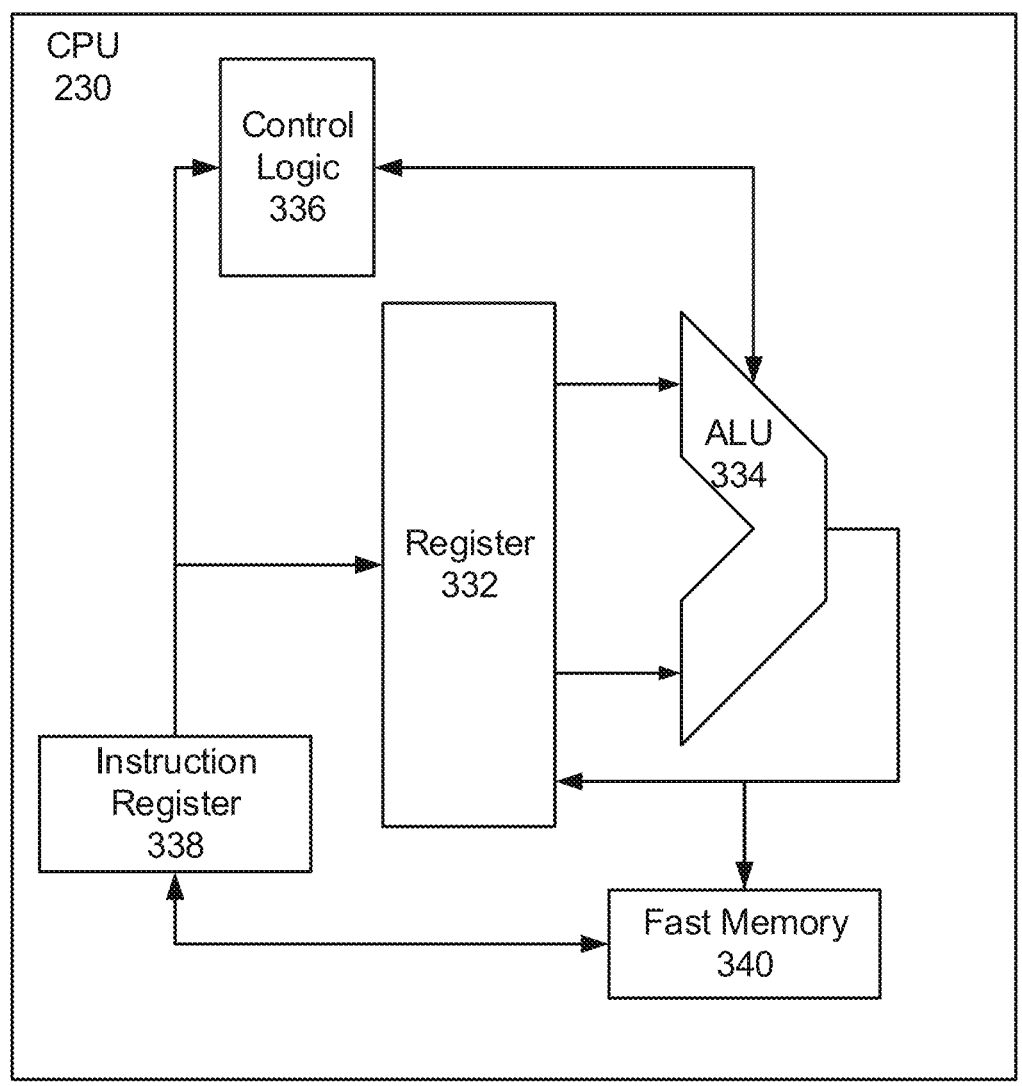
FIG. 22 illustrates one implementation of a CPU shown in FIG. 21.

For example, FIG. 22 shows one implementation of CPU 230. In one implementation, the instruction register 338 retrieves instructions from the fast memory 340. At least part of these instructions are fetched from the instruction register 338 by the control logic 336 and interpreted according to the instruction set architecture of the CPU 230. Part of the instructions can also be directed to the register 332. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 334 that loads values from the register 332 and performs logical and mathematical operations on the loaded values according to the instructions. The results from these operations can be feedback into the register and/or stored in the fast memory 340. According to certain implementations, the instruction set architecture of the CPU 230 can use a reduced instruction set architecture, a complex instruction set architecture, a vector processor architecture, a very large instruction word architecture. Furthermore, the CPU 230 can be based on the Von Neuman model or the Harvard model. The CPU 230 can be a digital signal processor, an FPGA, an ASIC, a PLA, a PLD, or a CPLD. Further, the CPU 230 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 21, the data processing system 200 can include that the SB/ICH 220 is coupled through a system bus to an I/O Bus, a read only memory (ROM) 256, universal serial bus (USB) port 264, a flash binary input/output system (BIOS) 268, and a graphics controller 258. PCI/PCIe devices can also be coupled to SB/ICH 220 through a PCI bus 262.

The PCI devices may include, for example, Ethernet adapters, add-in cards, and PC cards for notebook computers. The hard disk drive 260 and CD-ROM 266 can use, for example, an integrated drive electronics (IDE) or serial advanced technology attachment (SATA) interface. In one implementation the I/O bus can include a super I/O (SIO) device.

Further, the hard disk drive (HDD) 260 and optical drive 266 can also be coupled to the SB/ICH Y20 through a system bus. In one implementation, a keyboard 270, a mouse 272, a parallel port 278, and a serial port 276 can be connected to the system bust through the I/O bus. Other peripherals and devices that can be connected to the SB/ICH 220 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

REFERENCE SIGNS

100 Mobile Robot
105 Obstacle Detection Sensor
106 Communication Sensor
110 Guidance Generation Unit
120 Safety Sensitization Unit
130 Motion Actuation Unit
140 Motion Actuator
200 Data Processing System
220 Southbridge/ICH
225 Northbridge/MCH
230 CPU
245 Memory
250 Graphics Processor
256 ROM
258 Graphics Controller
260 Hard Disk Drive
262 PCI
264 USB
266 Optical Drive
270 Keyboard
272 Mouse
276 Serial Port
278 Parallel Port
332 Register
334 ALU
336 Control Logic
338 Instruction Register
340 Fast Memory

The invention claimed is:
1. A mobile robot comprising:
a motion actuator;
at least one detection sensor configured to detect field information in a movement field of the mobile robot;
a guidance generation unit configured to generate a motion guidance policy to a target position from a current position, the motion guidance policy being updated by the guidance generation unit when the field information has been received from the at least one detection sensor;
a safety sensitization unit configured to generate a safety sensitized policy which is the motion guidance policy with a reduced velocity magnitude relative to an angle between the motion guidance policy and the current motion of the mobile robot; and
a motion actuation unit configured to determine an actuation signal for instructing the motion actuator to project the current motion of the mobile robot in conformity with the safety sensitized policy provided by the safety sensitization unit.

2. The mobile robot of claim 1, wherein
the safety sensitization unit generates the safety sensitized policy by modulating the magnitude of the guidance policy using a positive factor of 1 to b, where b is less than 1.

3. The mobile robot of claim 1, wherein
the at least one detection sensor includes an obstacle detection sensor configured to detect physical obstacles within the movement field of the mobile robot and outputs information about the physical obstacles as at least part of the field information.

4. The mobile robot of claim 1, wherein
the at least one detection sensor includes a communication sensor configured to detect a signal coverage of a wireless communication signal and outputs information about the signal coverage as at least part of the field information.

5. The mobile robot of claim 1, wherein
the at least one detection sensor includes:
   an obstacle detection sensor configured to detect physical obstacles within the movement field of the mobile robot and outputs information about the physical obstacles as at least part of the field information, and
   a communication sensor configured to detect a signal coverage of a wireless communication signal and outputs information about the signal coverage as at least part of the field information.

6. The mobile robot of claim 3, wherein
the guidance generation unit updates the motion guidance policy such that movement into the physical obstacles is avoided.

7. The mobile robot of claim 4, wherein
the guidance generation unit updates the motion guidance policy such that movement into areas with low signal coverage is avoided and movement into areas with high signal coverage is favored.

8. The mobile robot of claim 1, wherein
the motion guidance policy is generated in-part using field information provided to the guidance generation unit in advance.

9. The mobile robot of claim 1, wherein
the motion actuator is a plurality of actuators configured to perform differential driving of the mobile robot.

10. The mobile robot of claim 1, wherein
the at least one detection sensor includes a GPS sensor.

11. A method of navigating a mobile robot, comprising the steps of:
detecting field information in a movement field of the mobile robot;
generating a movement guidance policy to a target position from a current position;
updating, when field information is detected in the detecting step, the motion guidance policy based on the detected field information;
generating a safety sensitized policy by reducing a velocity magnitude of the movement guidance policy relative to an angle between the motion guidance policy and a current motion of the mobile robot;
generating an actuation signal for actuating the motion of the mobile robot in conformity with the safety sensitized policy; and
driving the mobile robot in accordance with the actuation signal.

12. The method of claim 11, wherein
the safety sensitized policy is generated by modulating the magnitude of the guidance policy using a positive factor of 1 to b, where b is less than 1.

13. The method of claim 11, wherein
the field information detected in the detecting step is, at least in part, information about physical obstacles within the movement field of the mobile robot.

14. The method of claim 11, wherein
the field information detected in the detecting step is, at least in part, information about a signal coverage of a wireless communication signal within the movement field of the mobile robot.

15. The method of claim 11, wherein
the field information detected in the detecting step is, at least in part, information about physical obstacles within the movement field of the mobile robot and information about a signal coverage of a wireless communication signal within the movement field of the mobile robot.

16. The method of claim 13, wherein
the motion guidance policy is updated, in the updating step, such that movement into the physical obstacles is avoided.

17. The method of claim 14, wherein
the motion guidance policy is updated, in the updating step, such that movement into areas with low signal coverage is avoided and movement into areas with high signal coverage is favored.

18. The method of claim 11, wherein the motion guidance policy is generated in-part using field information provided in advance.

19. The method of claim 11, wherein the actuation signal for actuating the motion of the mobile robot is a plurality of signals for differentially driving the mobile robot.

20. A non-transitory computer-readable storage medium storing instructions to cause a computer to perform the steps of:
detecting field information in a movement field of a mobile robot;
generating a movement guidance policy to a target position from a current position;
updating, when field information is detected in the detecting step, the motion guidance policy based on the detected field information;
generating a safety sensitized policy by reducing a velocity magnitude of the movement guidance policy relative to an angle between the motion guidance policy and a current motion of the mobile robot;
generating an actuation signal for actuating the motion of the mobile robot in conformity with the safety sensitized policy; and driving the mobile robot in accordance with the actuation signal.

* * * * *